No. 749,216. PATENTED JAN. 12, 1904.
G. W. McNEAR, Jr.
GRAIN TRANSPORTING AND WEIGHING APPARATUS.
APPLICATION FILED JUNE 29, 1903.
NO MODEL.
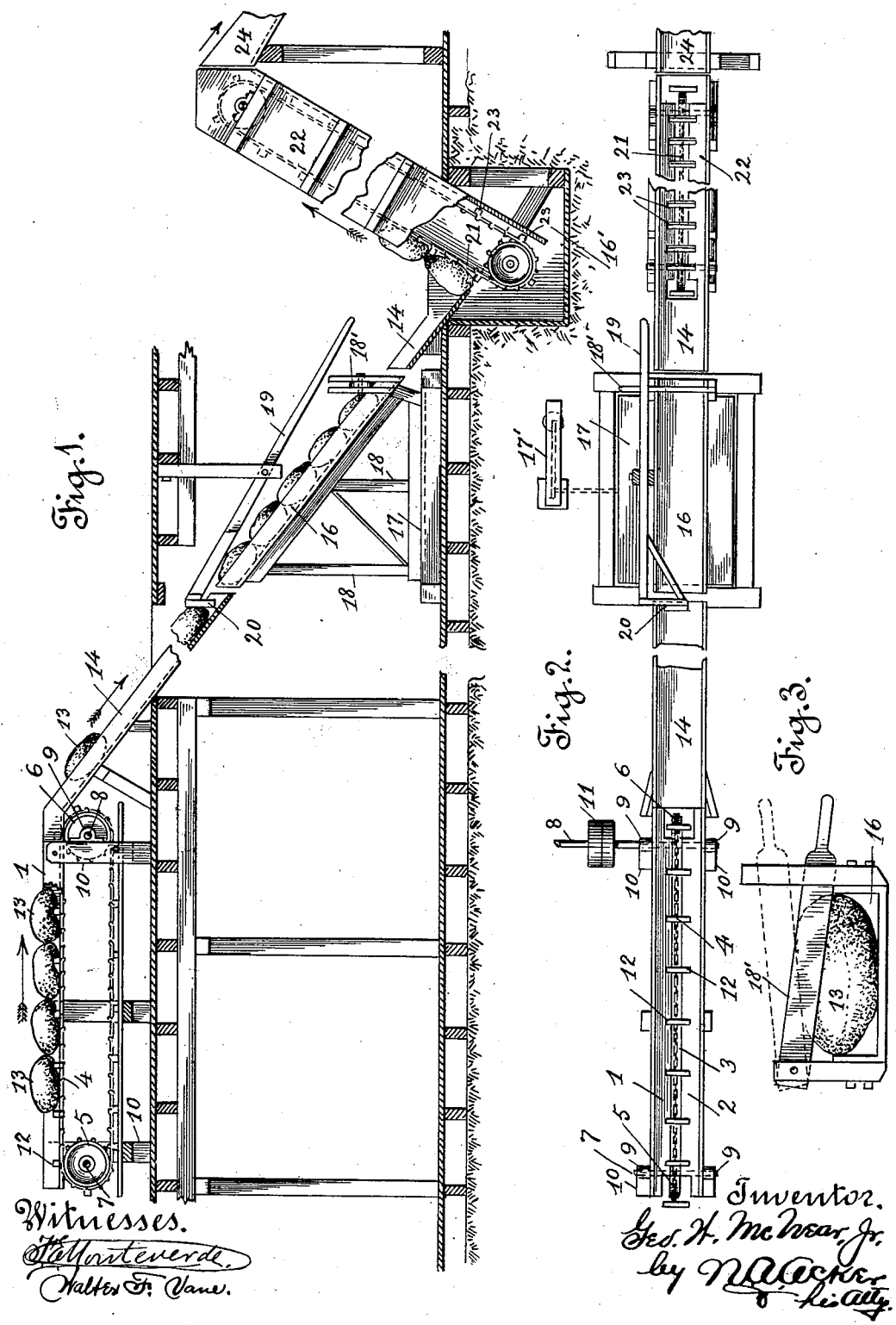

No. 749,216. Patented January 12, 1904.

UNITED STATES PATENT OFFICE.

GEORGE W. McNEAR, JR., OF OAKLAND, CALIFORNIA.

GRAIN TRANSPORTING AND WEIGHING APPARATUS.

SPECIFICATION forming part of Letters Patent No. 749,216, dated January 12, 1904.

Application filed June 29, 1903. Serial No. 163,479. (No model.)

*To all whom it may concern:*

Be it known that I, GEORGE W. McNEAR, Jr., a citizen of the United States, residing at Oakland, county of Alameda, State of California, have invented certain new and useful Improvements in Grain Transporting and Weighing Apparatus; and I do hereby declare the following to be a full, clear, and exact description of the same.

The present invention relates to means for transporting grain from the sacking station or department onto a vessel or to a suitable place of deposit and during the transportation of the sacked grain weighing the same as the sacks of grain move toward the vessel or place of deposit, the object of the invention being to provide for the weighing of the sacked grain during its movement toward the vessel or place of deposit without requiring separate handling of the sacks, thereby reducing the cost incident to the delivery of the sacked grain.

To comprehend the invention, reference should be had to the accompanying sheet of drawings, wherein—

Figure 1 is a broken part-sectional detail view in side elevation disclosing the runway or trough for transporting the sacked grain from the receiving-point to a suitable discharge-chute, the movable section supported by the platform of an ordinary weighing-scale, with means controlling the movement of a given number of sacks upon the movable section. Fig. 2 is a top plan view of the mechanism disclosed by Fig. 1 of the drawings; and Fig. 3 is an end view of the movable section, disclosing the lock-bar for retaining the sacks upon the movable section while being weighed.

The numeral 1 is used to indicate a receiving trough or runway leading from a sacking station, department, or other suitable place for receiving the grain. Said trough or runway's bottom 2 is formed with a central slot or opening 3, which extends the entire length of the trough or runway 1. Within this slot or central opening 3 travels a narrow endless belt or conveyer 4, which works over sprocket-wheels 5 6. These wheels are mounted upon shafts 7 8, working in bearing 9 of the supports 10 for the runway or trough 1. The shafts 7 and 8 are driven by means of a suitable drive-belt working over the pulley-wheel 11, secured to the said shaft 8.

To the surface of the endless belt or conveyer at suitable intervals are affixed the blocks or cleats 12, which cleats ride upon the upper surface of the bottom 2, so that anything placed upon or within the trough or runway 1 will be moved or carried to the end of the said trough or runway by means of the traveling or propelled blocks or cleats 12. The bags or sacks 13 of grain are thus after being placed upon or within the receiving trough or runway conveyed to the end thereof and delivered onto an inclined chute, trough, or runway 14, which preferably stands at a downward inclination to the trough or runway 1. Owing to the inclination of the chute, trough, or runway 14, the sacks of grain will move therein by gravity. This inclined chute, trough, or runway 14 is formed with a movable section 16, which is supported immediately above a scale-platform 17 by the supports 18. The length of this section, which shall hereinafter be termed a "weighing-section," equals approximately the length of about five sacks or bags 13.

At the lower end of the weighing-section is pivoted the transverse lock bar or gate 18', which bar when lowered serves as a stop for the downward movement of the sacks or bags 13. This lock bar or gate 18' is thrown downward or across the lower end of the weighing-section 16 until five or any other desired number of bags or sacks 13 have been received within said section of the runway, chute, or trough 14, when the person having charge raises the lower end of the fulcrumed lever 19 in order to lower the lock bar or gate 20 for the upper end of the weighing-section 16. The lowering of this lock bar or gate 20 closes the runway, chute, or trough 14 against the admission of sacks or bags 13 onto the weighing-section 16. The weight of the bags or sacks of grain thus locked within the weighing-section is placed upon the scale-platform 17 of any suitable warehouse-scale 17' and the combined weight of the locked bags or sacks of grain taken. After the bags or sacks have been weighed the person in charge raises the lower lock bar or gate 18, so as to permit the weighed sacks of grain to continue their downward movement within the lower portion of the chute, trough, or runway 14. The moment the weighed sacks have passed from off the weighing-section 16 the lock bar or gate 18 is lowered or closed and the upper lock bar or gate 20 is raised to permit of the sacks of grain previously restrained thereby to descend onto the weighing-section 16. As the weighed sacks of grain reach the lower end of the chute, trough, or runway 14 within the pit 16' the same are delivered onto an endless traveling conveyer or elevator 21. This elevator works within an upwardly-extending trough 22, the sacks of grain received thereon being held by means of the blocks or cleats 23. As the sacks of grain reach the upper end of the trough 22 they are discharged into the chute 24, which delivers the same onto a vessel or at any suitable place of deposit. The elevator 21 is employed for the purpose of elevating the weighed sacks to a height sufficient to permit of the same being delivered into a chute having sufficient inclination to convey the same onto a vessel for receiving the grain or to a suitable place of deposit. The employment of this elevator presumes the depth of the sacks when delivered from the chute, trough, or runway 15 to be such as to require elevation thereof.

It will be readily understood that where the conditions are otherwise—that is, the discharge end of the chute, trough, or runway is above the point of discharge—the elevator 21 may be dispensed with. In such case the lower portion of the chute, trough, or runway may be continued to the place of discharge or an independent section hinged to the lower end of the trough, chute, or runway for this purpose.

By the use of the present invention the grain may be transported direct from the sacking-point for the grain to the vessel to be loaded or to a suitable place of deposit, during its travel the sacks of grain being weighed without delay to the work of transporting the said sacked grain.

Having thus described the invention, what is claimed as new, and desired to be protected by Letters Patent, is—

1. A transporting device for sacked grain, the same consisting of a receiving trough or runway, means working therein for conveying sacks of grain therethrough, a chute connected thereto for receiving the sacks of grain and delivering the same to a suitable place of deposit, a weighing-section incorporated within said chute, and means for retaining a given number of sacks within said section.

2. The combination with a delivery-chute into which sacks of grain are fed, of a movable weighing-section interposed within the length of said chute, means for controlling the movement of the sacks onto and from said weighing-section, and elevating means for receiving the weighed sacks and conveying the same to a suitable place of deposit.

3. In an apparatus for transporting and weighing sacked grain, the combination with a delivery-chute into which sacks of grain are fed, of a movable section interposed within the said chute, weighing means connected with the movable section of the chute, devices interposed within the chute for controlling the movement of the sacks onto and from the movable section of the said chute.

In witness whereof I have hereunto set my hand.

GEORGE W. McNEAR, JR.

Witnesses:
HENRY C. DROGER,
JAMES L. KING.